(12) United States Patent
Vaughan et al.

(10) Patent No.: US 6,776,901 B1
(45) Date of Patent: Aug. 17, 2004

(54) QUIET FLOW CONTROL WASHER FOR WATER SOFTENER OR THE LIKE

(75) Inventors: Don Vaughan, Brookfield, WI (US); Paul D. Nielsen, Bluffdale, UT (US)

(73) Assignee: Clack Corporation, Windsor, WI (US)

( * ) Notice: Subject to any disclaimer, the term of this patent is extended or adjusted under 35 U.S.C. 154(b) by 233 days.

(21) Appl. No.: 09/998,060

(22) Filed: Nov. 30, 2001

(51) Int. Cl.$^7$ .............................. C02F 5/00; G05D 11/03
(52) U.S. Cl. ....................... 210/190; 137/1; 137/599.01; 137/895
(58) Field of Search ................................. 137/893, 895, 137/599.01, 1; 210/190

(56) References Cited

U.S. PATENT DOCUMENTS

| | | | |
|---|---|---|---|
| 2,245,767 A | | 6/1941 | Eickmeyer et al. |
| 3,225,789 A | * | 12/1965 | Thompson ............. 137/599.12 |
| 3,250,342 A | | 5/1966 | Petry |
| 3,460,566 A | | 8/1969 | Heartstedt et al. |
| 3,473,481 A | * | 10/1969 | Brane ........................ 137/895 |
| 3,712,341 A | | 1/1973 | Constantin et al. |
| 4,136,032 A | | 1/1979 | Bakken et al. |
| 4,210,532 A | | 7/1980 | Loke |
| 4,221,335 A | * | 9/1980 | Shames et al. ............... 138/45 |
| 4,512,548 A | | 4/1985 | Keller |
| 4,880,447 A | * | 11/1989 | Bloch .......................... 95/225 |
| 5,162,080 A | | 11/1992 | Drager et al. |
| 5,226,446 A | | 7/1993 | Cooper |
| 5,301,718 A | * | 4/1994 | Bolhofner ................... 137/893 |
| 5,738,138 A | | 4/1998 | Grunert et al. |

\* cited by examiner

*Primary Examiner*—Stephen M. Hepperle
(74) *Attorney, Agent, or Firm*—Boyle Fredrickson Newholm Stein & Gratz S.C.

(57) ABSTRACT

A flow control includes a conduit and a flow control washer disposed in the conduit between the conduit's inlet and the outlet. A gas inlet passage opens into the conduit, preferably at a location just downstream of the flow control washer, to permit a gas (typically ambient air) to enter a liquid stream flowing through the flow control washer. The admission of a gas into this liquid stream reduces noise generated by liquid flow through the flow control washer. Gas induction and noise reduction capabilities may be enhanced by admitting the gas fluid into a low pressure region of a venturi located in the conduit downstream of the flow control washer. The flow control is particularly useful in a wastewater drain of a water softener control valve, but is also useful in a variety of other applications. A method of reducing noise in a flow control is also provided.

19 Claims, 4 Drawing Sheets

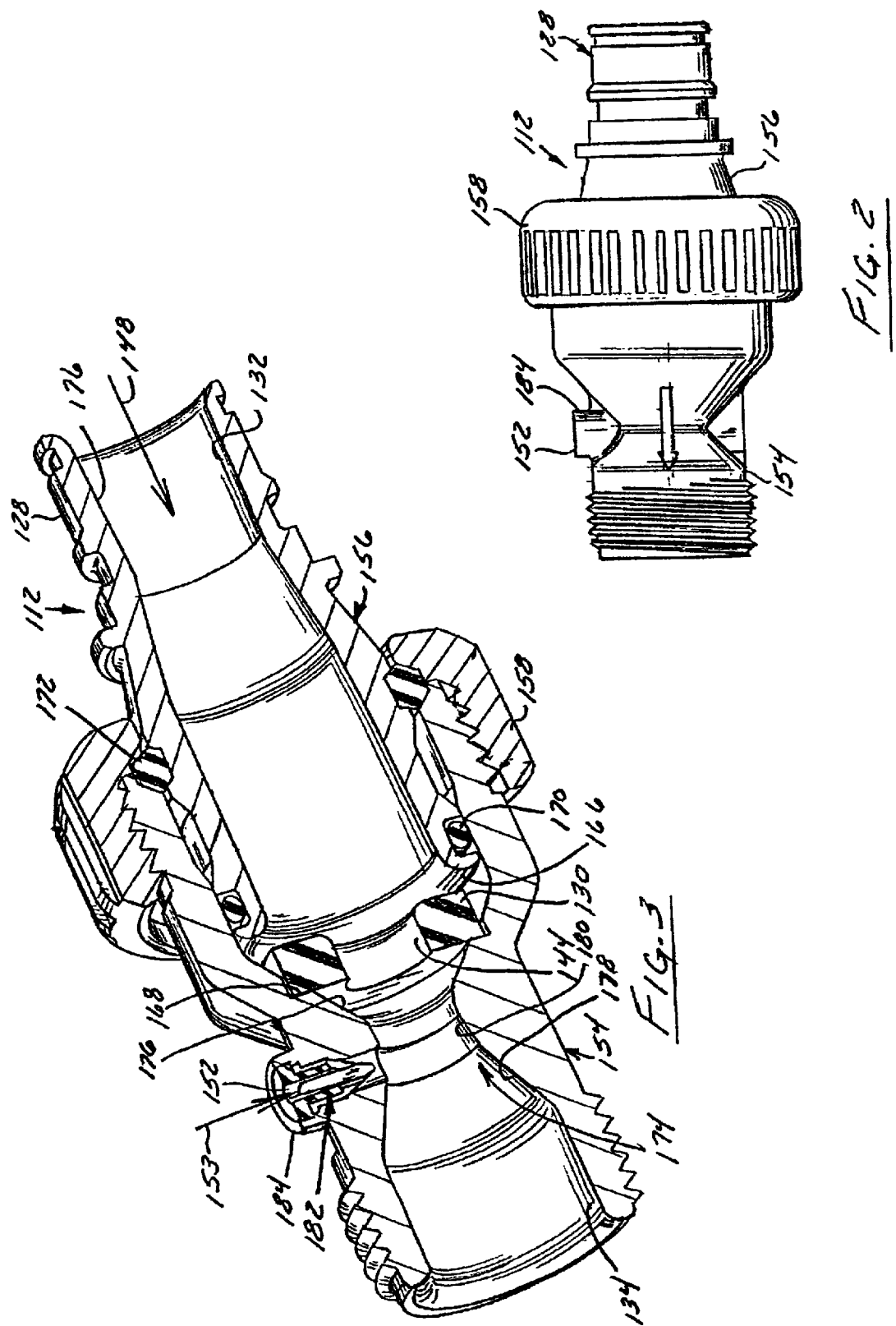

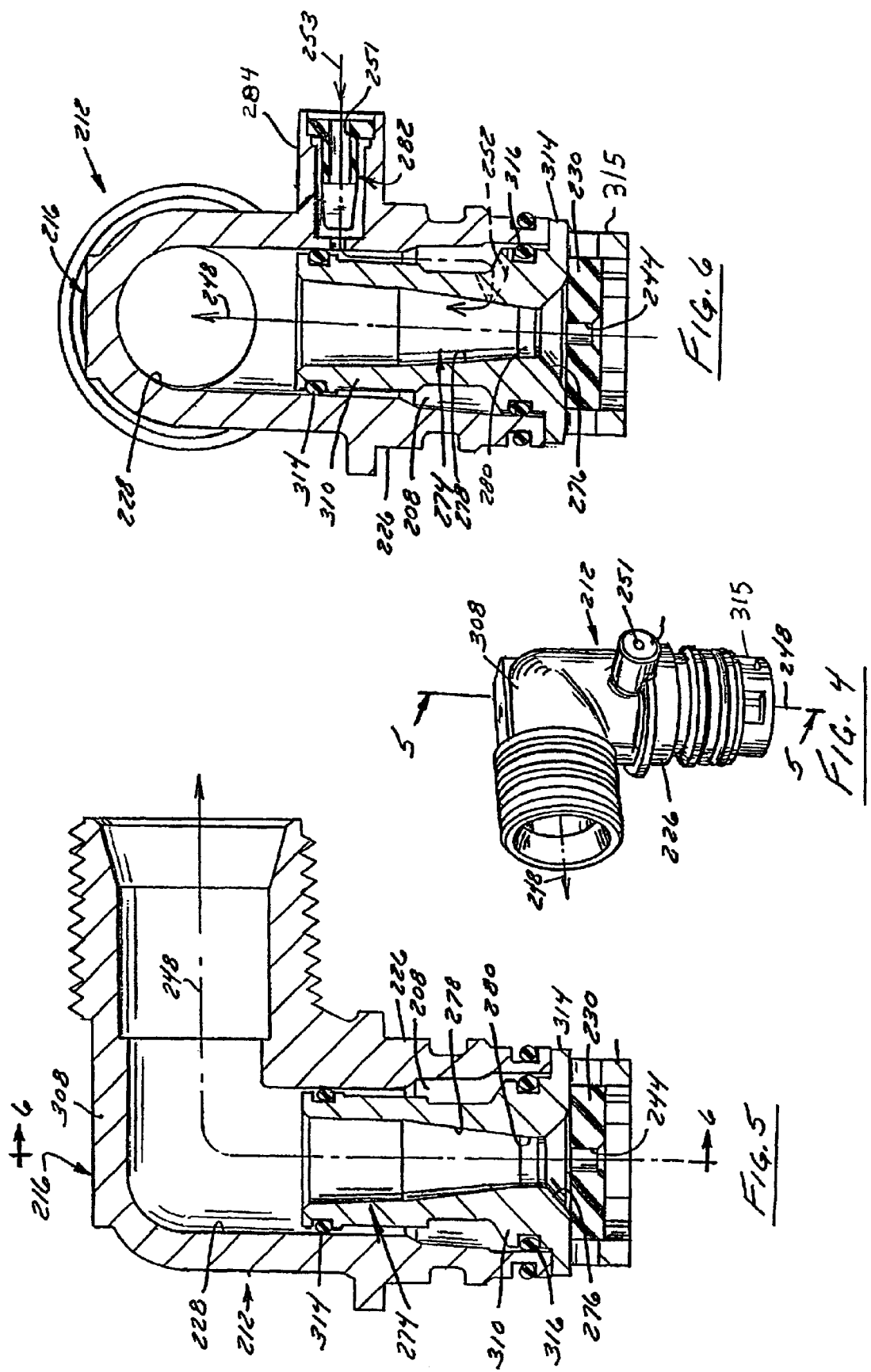

QUIET FLOW CONTROL WASHER FOR WATER SOFTENER OR THE LIKE

BACKGROUND OF THE INVENTION

1. Field of the Invention

The invention relates to flow control devices and, in particular, to a flow control having a flow control washer that maintains a generally constant volumetric flow rate through a liquid stream despite fluctuations in supply pressure.

2. Description of the Related Art

Flow controls are commonly used in appliances such as dishwashers, drinking fountains, and water softeners to compensate for variations in water supply pressure. The typical flow control comprises an annular flexible flow control washer mounted in a conduit such that water flowing through the conduit must flow through a central orifice in the flow control washer. The flow control washer and its support in the conduit are configured so that the orifice constricts as the water pressure increases, thereby maintaining a generally constant volumetric liquid flow rate through the conduit despite variations in supply pressure. A flow control of this general type has been used in water softeners as is detailed in U.S. Pat. No. 4,210,532 to Loke and in U.S. Pat. No. 5,162,080 to Dragger.

Flow controls of the above-mentioned type tend to be very noisy in operation, possibly due to cavitation caused by the pressure drop across the washer and/or to vibrations of the washer itself. In fact, in the case of a water softener, the whistling noise generated by the flow of water through the flow control can often proprogate through the pipes and be heard throughout much of the building.

This noise problem has been recognized and addressed, but never satisfactorily. For instance, U.S. Pat. No. 5,226,446 to Cooper proposes a rather complex anticavitation arrangement disposed downstream of the flow control washer. U.S. Pat. No. 3,250,342 to Petry proposes an expansion duct having apertures to recycle a portion of the fluid flow. U.S. Pat. No. 3,712,341 to Constantin proposes a flow separator for separating a downstream fluid influx from an upstream fluid flow. All of these arrangements are relative complex, are relatively expensive to manufacture and install, and are of questionable effectiveness.

In view of the foregoing, it would be desirable to provide a flow control that solves the noise problems associated with prior flow controls in a simple and effective manner.

SUMMARY OF THE INVENTION

The invention, which is defined by the claims set out at the end of this disclosure, is intended to solve at least some of the problems noted above. In accordance with a first aspect of the invention, the above-identified need is satisfied by providing a flow control comprising a conduit and flow control washer disposed in the conduit between its inlet and its outlet. "Conduit," as used herein, means an enclosed passageway capable of receiving a flow control washer. An ambient fluid passageway opens into the conduit, preferably at a location just downstream of the flow control washer, to permit a gas (typically ambient air) to enter a liquid stream flowing from the flow control washer. The admission of the gas into this liquid stream reduces noise generated by liquid flow through the flow control washer. Gas induction and noise reduction capabilities may be enhanced by admitting the gas into a low pressure region of a venturi located in the conduit adjacent the flow control washer. The venturi may be formed integrally with the conduit or provided as a separate insert fitted in the conduit.

A method of reducing noise in a flow control is also provided. In the method, liquid flows through a flow control washer of a flow control conduit at a volumetric flow rate that remains generally constant, despite pressure fluctuations in the flowing liquid, due to operation of the flow control washer. A gas (typically ambient air) is drawn into the liquid flow to reduce the noise that would otherwise be generated by operation of the flow control.

The flow control can be used in any application where the flow rate is controlled within a particular pressure range. Examples of uses for the flow control include, but are not limited to, water softeners, water fountains, eye washes, dishwashers, and safety showers. If used on conjunction with a simple on/off valve, it can also be used do measure or dispense a given volume of fluid, without having to make volumetric measurements, simply by relying the flow control to maintain a desired fluid flow rate therethrough and automatically or manually closing the valve at the appropriate time. Hence, if a flow control maintains a flow rate therethrough at 2 gpm, 20 gallons can be reliably measured or dispensed simply by closing an associated valve after 10 minutes of flow through the flow control.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation.

BRIEF DESCRIPTION OF THE DRAWINGS

Preferred exemplary embodiments of the invention are illustrated in the accompanying drawings, in which like reference numerals represent like parts throughout and in which:

FIG. 2 is a side elevation view of a second, more practical embodiment of a flow control in accordance with the invention;

FIG. 3 is a sectional perspective view of the flow control of FIG. 2;

FIG. 4 is a perspective view of a third preferred embodiment of a flow control in accordance with the invention;

FIG. 5 is a sectional elevation view of the flow control of FIG. 4, taken generally along line 5—5 in FIG. 4;

FIG. 6 is a sectional elevation view of the flow control of FIG. 4, taken generally along line 6—6 in FIG. 5.

Figure 1:
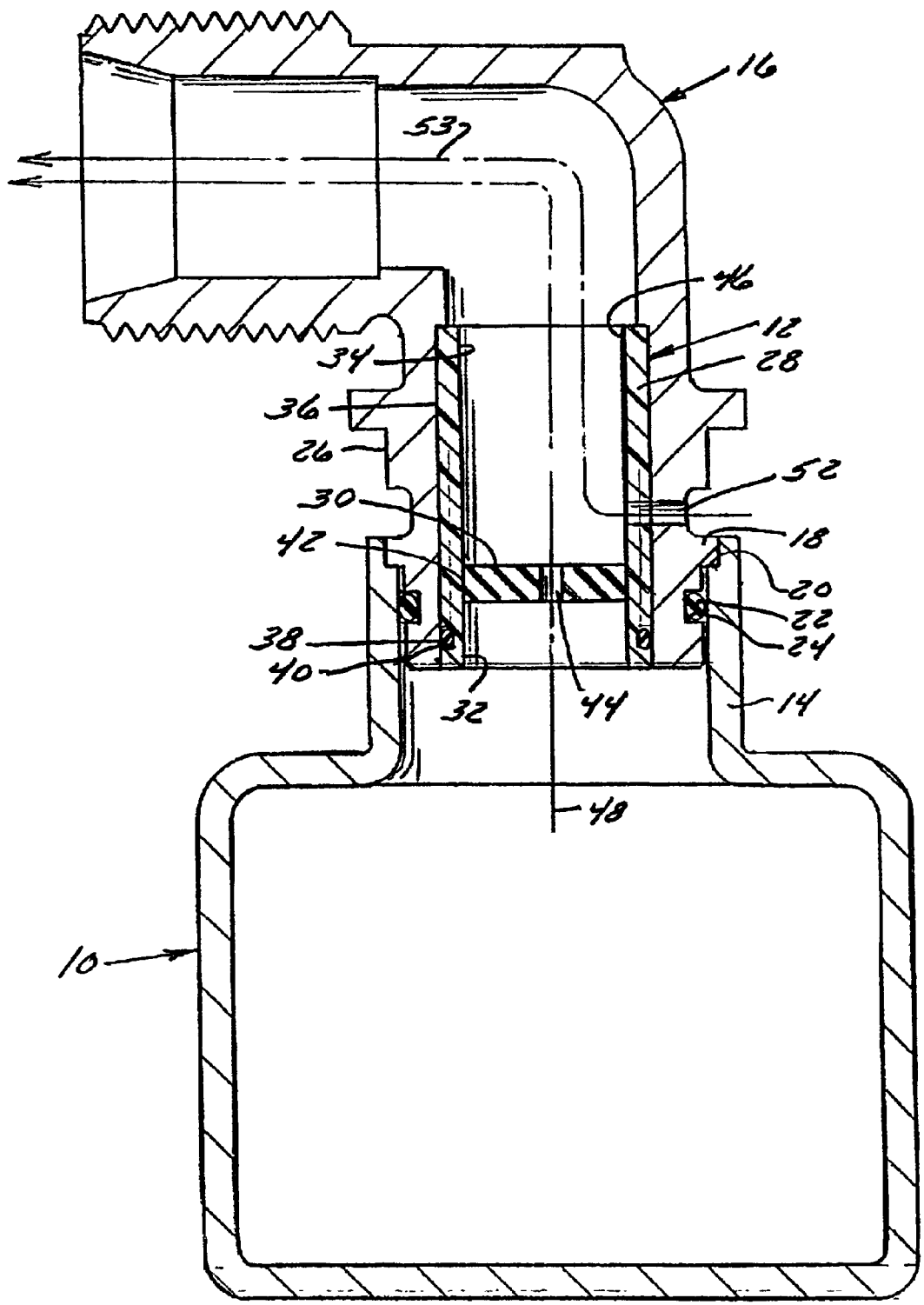
FIG. 1 is a sectional elevation view of a vessel incorporating a flow control constructed in accordance with a first embodiment of the invention.

Before explaining embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

1. Resume

Pursuant to the invention, a flow control is provided that is configured to reduce or even eliminate noise associated with previous flow controls. The flow control includes a bore that draws a gas into a liquid stream in the vicinity of a flow control washer of the flow control for purposes of noise reduction. It has been discovered that the noises caused by the flow of liquid through the washer can be reduced or even eliminated simply by including a small bore in the flow control just downstream of the flow control washer for the admission of the gas, typically ambient air.

2. System Overview and First Embodiment of Flow Control

Referring to the drawings and initially to FIG. 1, a vessel 10 is schematically illustrated that employs a flow control 12 that is constructed in accordance with a preferred embodiment of the invention. The vessel 10 may be any system or structure from which water or another liquid is intended to flow at a generally constant volumetric flow rate. Examples of such structures are drinking fountains and eye washers. The vessel 10 could also be a backwashable filter, in which case the flow control 12 would be used in a control valve used to help control the backwashing process. The vessel 10 includes an outlet port 14 for the discharge of liquid, typically water, to another location, typically the ambient atmosphere. The liquid could also be discharged to a pressurized outlet. The outlet port 14 is coupled to a discharge line (not shown) by an elbow fitting 16. The elbow fitting 6 includes an annular lip 18 around its outer periphery that rests against a shoulder 20 of the outlet port 14. An O-ring 22, which is disposed in a groove 24 in the outer periphery of the elbow 16, forms a seal between an inner periphery of the outlet port 14 and the elbow 16.

The flow control 12 may be provided as a standalone item as in the illustrated embodiment or as part of a more complex valve assembly. The flow control 12 also may be formed integrally with an existing conduit or inserted into that conduit. In the embodiment of FIG. 1, the flow control 12 is inserted in a lower, vertical leg 26 of the elbow fitting 16. The flow control 12 of the embodiment of FIG. 1 comprises 1) a tubular conduit in the form of a plastic tube 28 and 2) a flow control washer 30 mounted in the tube 28. The tube 28 has an inlet 32, an outlet 34, and an outer peripheral surface 36. The outer peripheral surface 36 is press-fit into the lower leg 26 of the elbow 16 and sealed to the elbow 16 by an O-ring 38 mounted on a groove 40 in the outer peripheral surface 36 of the tube 28. As is conventional, the flow control washer 30 comprises an annular elastomeric washer having an outer periphery 42 and a center orifice 44. The outer periphery 42 is held in place within the tube 28 and sealed against an inner peripheral surface 46 of the tube 28 in a conventional manner. Alternatively, and as is more typically the case in flow controls, the washer 12 could simply rest on a shelf-like seat and be sealed to the seat during operation by the pressure differential thereacross. The center orifice 44 forms a flow path for water or another liquid through the washer 30. The flow control washer 30 is configured so that the diameter of the orifice 44 constricts generally proportionally as the pressure drop across the washer 30 increases, thereby maintaining the volumetric flow rate of liquid through the washer 30 at least generally constant regardless of variations in supply pressure. Hence, fluid travels through the orifice 44 in the flow control washer 30 at a generally constant volumetric flow rate, exiting the tube 28, and is discharged from the fitting 16.

The flow control 12 also includes a passageway 52 that admits a gas into the flow control 12 in a low pressure region of the flow control. The passageway 52 extends through the elbow 16, through the tube 28 and into the interior of the tube 28 at a location downstream of the flow control washer 30. The passageway 52 of the embodiment comprises a simple bore drilled through the fitting 16 and tube 28. The bore 52 permits a gas to enter the liquid stream flowing from the flow control washer 30, as is shown by arrow 53. The gas will typically comprise ambient air and, therefore, will hereafter be referred to as "air" for the sake of convenience. It has been observed that the flow of liquid through the flow control washer 30 causes a venturi effect that produces low pressure that draws air into the bore 52 and discharges a frothy air/liquid mixture from the outlet 46. The manner in which the bore 52 actually eliminates the noise that is associated with the flow control washer 30 is unknown. While applicant does not wish to be restricted to a particular theory of how the bore 52 in the inventive flow control 12 reduces or even eliminates noise, the following theory explanation of how the bore 52 functions.

In conventional flow controls, air is distilled or otherwise removed from the liquid passing through the flow control washer. This and/or other factors generate noise, possibly by 1) cavitation in the low pressure region of the flow control downstream of the flow control washer and/or 2, vibration of the flow control washer at its resonant frequency. These noises can be carried and amplified throughout a building that includes the device having the flow control. It is believed that the introduction of air into the flow control 12 detunes the rubber of the flow control washer 30. The detuning is believed to change the natural frequency of the flow control washer 30 sufficiently to avoid resonance. It is also believed that, in the inventive flow control 12, the bore 52 negates a low pressure created by the accelerated liquid. That is, the flow of air into the liquid stream raises the minimum pressure in the system to a level that prevents cavitation.

The desired upper diameter of the bore 52 is limited by the production of noise from the air induction itself, while the desired lower diameter of the bore 52 is limited by the ability of the flow control 12 to draw enough ambient air into the flow control 12 to achieve the desired noise reduction effect in the tube 28. When the discharged liquid is water and the tube 28 has a diameter on the order of 0.5" to 2.0", the bore diameter preferably is between 0.020" and 0.060", and preferably about 0.035".

Flow controls constructed in accordance with the invention can accommodate a variety of volumetric flow rates. Depending on the sizing of the flow control flow rates of from about 0.5 gpm to about 25 gpm or even higher can be accommodated. They can also accommodate a wide range of supply pressures of, e.g., from less than 20 psig to more than 12.5 psig, for a typical application in which the liquid is discharged to the atmosphere at 14 psig.

3. Second Embodiment of the Flow Control

A second preferred embodiment of the flow control 112 is shown in FIGS. 2–3. The flow control 112 of the second preferred embodiment is similar to the flow control 12 of first preferred embodiment. Elements of the flow control 112 of FIGS. 2–3 corresponding to elements of the flow control 12 of FIG. 1 are incremented by 100. Flow control 112 therefore includes a tubular conduit 128 and a flow control washer 130. The conduit 128 has an inlet 132 and an outlet 134. A passageway 152 is formed in the conduit 128 downstream of the flow control washer 130 to admit gas into the conduit 128 for noise reduction purposes. However, the flow control 112 of this embodiment is significantly different from the embodiment of FIG. 1 in some respects.

For instance, the conduit 128 is configured to be mounted in series between two other conduits (not shown) and to facilitate mounting of the flow control washer 130 in the conduit 128. The conduit 128 therefore is formed from a connector having female and male sections 154, 156 secured to each other via a swage fitting 158 threaded onto the female section 154 and secured to male section 156 by locking ring 172. The washer 130 is positioned between a downstream axial end 166 of the male section 156 and a shoulder 168 on the female section 154. The female section 154 is sealed to the male section 156 by an O-ring 170 disposed radially between the sections 154, 156 in the vicinity of the swage fitting 158.

In addition, the interior of the female fitting 160 is shaped to enhance the venturi effect of liquid flow though the flow control 112 in order to enhance airflow into the flow conduit 128 and the resultant noise reduction. Specifically, a venturi 174 is formed in the conduit 128 downstream of the washer 130. The venturi 174 includes a conically tapered inlet 176, a conically tapered outlet 178, and a relatively narrow throat 180 disposed between the inlet 176 and the outlet 178. The bore 152 opens into the interior of the conduit 128 at the throat 180 of the venturi 174, where the pressure drop of fluid flowing through the flow control 112 is a maximum.

A one-way valve 182 is also provided in this embodiment to prevent liquid from back flowing out of the bore 152. Suitable valves include, but are not limited to, check valves, flapper valve, and duck-billed valves. The illustrated valve 182 is a duck-billed valve disposed in a boss 184 containing an outer end portion of the bore 152. The valve 182 is formed from a rubber or other elastomeric material that is slit down its middle. The rubber halves of the valve 182 move apart to admit air into the bore 152, but close to prevent the egress of liquid from the bore 152.

In use, a liquid such as water enters the inlet 132 of the conduit 128 as represented by the arrow 148 in FIG. 3, flows through a central orifice 144 in the flow control washer 130, flows through the venturi 174, and exits the outlet 134 of the conduit 128. Supply pressure fluctuations are accommodated by expansion and constriction of the orifice 144 to maintain a substantially constant volumetric flow rate through the flow control washer 130 and downstream components of the flow control 112. The pressure drop created by liquid flow through the washer 130 and augmented by the venturi 174 draws a gas such as ambient air through the bore 152 and into the throat 180 of the venturi 174 as represented by the arrow 153, thereby attenuating noises that otherwise would be generated by operation of the flow control 112. The rubber halves of the duckbill valve 182 move apart to admit air into the bore 152 during this process, but close to prevent the egress of liquid form the bore 152.

4. Third Embodiment of the Flow Control

A third preferred embodiment of the flow control 212, which is illustrated in FIGS. 4–6, differs from the second preferred embodiment in that the venturi 274 is configured for installation in a separate fitting rather than being formed integrally with a fitting. Elements of the flow control 212 of FIGS. 4–6 corresponding to elements of the flow control 112 of FIGS. 2 and 3 are incremented by 100. The flow control 212 therefore includes a conduit 228 incorporating an integral venturi 274 and a flow control washer 230 mounted in the conduit 228 and having a central orifice 244.

Figure 7:
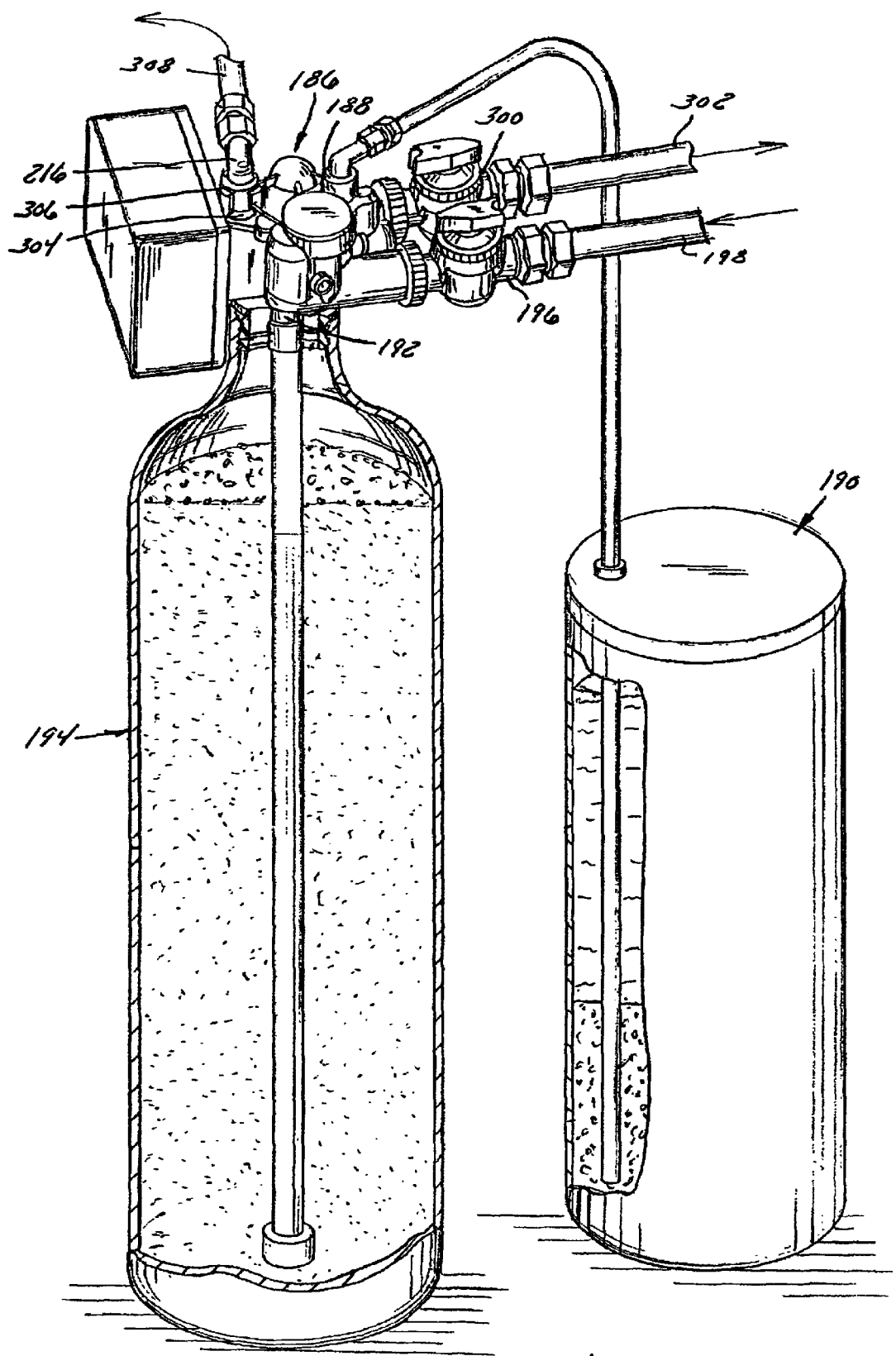
FIG. 7 is a perspective view of a water softener that incorporates a flow control constructed in accordance with the invention.

The flow control 212 of this embodiment is configured to minimize redesign of a flow control used in a drain fitting of a water softener control valve such as the valve 186 illustrated in FIG. 7. The water softener control valve 186 includes a brine port 188 connected to a brine tank 190, a service port 192 connected to a resin tank 194 containing a treatment medium, an inlet port 196 connected to an untreated water inlet line 198, an outlet port 300 connected to a treated water outlet line 302, and a wastewater discharge port 304 opening into a wastewater discharge fitting 306 connected to a drain line 308. The flow control 212 is disposed in the wastewater discharge fitting 306.

Referring back to FIGS. 4–6, the discharge fitting 306 comprises an elbow 216 incorporating the flow control 212. The elbow 216 includes 1) a vertical upstream leg 226 configured for mounting in the wastewater discharge port 304 (FIG. 7) and 2) a horizontal downstream leg 308 configured for threaded connection to the drain line 308 (FIG. 7). The flow control 212 is formed in an insert 310 that is installed into the vertical leg 226 of the fitting 216 from the inner end. An outer peripheral surface of the insert 310 is sealed to an inner peripheral surface of the vertical leg 226 by a pair of spaced O-rings 316, 317. Sliding movement of the insert 310 due to pressure differential from operation of the flow control into the vertical leg 226 of the fitting 216 is limited by engagement of an annular ring 314 on the insert 310 with the upstream end of the fitting 216. The fitting is otherwise held in place by friction from O-rings 314 and 316. A boss 315 extends upstream from the ring 314 and is configured to extend into the discharge port 304 of the water softener control valve 186. The flow control washer 230 is also positioned loosely within the boss 315 adjacent the ring 314.

The venturi 274 includes a conically tapered inlet 276, a conically tapered outlet 278, and a relatively narrow throat 280 disposed therebetween. An air inlet passage connects the ambient atmosphere to a low pressure region of the venturi 274 to permit air to flow into the low pressure region as represented by the arrow 253. In the illustrated embodiment, the passage is formed from a bore 251 through a boss 284 on the fitting 216, through an annular space 208 formed between the outer peripheral surface of the insert 310 and the inner peripheral surface of the fitting 216, and through a bore 252 opening into the outlet portion 278 of the venturi 274 near the throat 280. As with the embodiment of FIGS. 2 and 3, the venturi 274 augments the venturi effect caused by the flow of liquid through the flow control washer 230 to maximize the noise reduction effects of airflow into the flow control 212. Finally, and also as in the second embodiment, a duck-billed one-way valve 282 is mounted in the boss 284 to prevent water from flowing out of the flow control 212 via the air inlet passage.

5. Noise Reduction

The data shown in the Tables 1–4 below demonstrate the difference in noise reduction using a relatively small (0.5" diameter) elbow for fitting in a water softener drain port fitting constructed in accordance with the third embodiment of the invention. Data are shown as "A weighted," which is used for scientific purposes, and "C weighted," which approximates the human ear. The fitting was connected to the water softener control valve 185 and to the drain line 203 with flexible tubes to isolate the flow control 212 from external noise sources. Noise levels were tested at various flow rates in gallons per minute (GPM). Noise was measured with air introduced via the bore 252 of the flow control (WITH AIR) and without air introduced (W/O AIR). The difference between the two noise measurements is shown in the column labeled "DIFF."

TABLE 1

NOISE TEST WS1 CONTROL VALVE (inlet pressure 70 PSI) BACKGROUND NOISE WAS 53 (37) dB AT 18" TEST C (A) WEIGHTED

18 INCHES TO THE LEFT SIDE OF VALVE @ 57" HIGH

| | C WEIGHTED | | | A WEIGHTED | | |
|---|---|---|---|---|---|---|
| GPM | WITH AIR | W/O AIR | DIFF. | WITH AIR | W/O AIR | DIFF. |
| 0.7 | 72.0 | 78.5 | 6.5 | 77.0 | 80.9 | 3.9 |
| 1.0 | 69.5 | 80.0 | 10.5 | 68.6 | 82.5 | 13.9 |
| 1.3 | 74.0 | 81.5 | 7.5 | 72.3 | 80.5 | 8.2 |
| 1.7 | 70.8 | 80.0 | 9.2 | 68.2 | 80.5 | 12.3 |
| 2.2 | 70.5 | 80.0 | 9.5 | 73.4 | 82.0 | 8.6 |
| 2.7 | 68.0 | 78.0 | 10.0 | 68.5 | 80.2 | 11.7 |
| 3.2 | 68.5 | 79.3 | 10.8 | 69.5 | 81.0 | 11.5 |
| 4.2 | 69.0 | 78.5 | 9.5 | 70.8 | 81.0 | 10.2 |
| 5.3 | 71.0 | 78.0 | 7.0 | 72.0 | 79.5 | 7.5 |

TABLE 2

NOISE TEST WS1 CONTROL VALVE (inlet pressure 70 PSI) BACKGROUND NOISE WAS 52 (35) dB AT THE 36" POSITION C (A) WEIGHTED

36 INCHES IN FRONT OF VAVLE @ 57" HIGH

| | C WEIGHTED | | | A WEIGHTED | | |
|---|---|---|---|---|---|---|
| GPM | WITH AIR | W/O AIR | DIFF. | WITH AIR | W/O AIR | DIFF. |
| 0.7 | 69.0 | 74.0 | 5.0 | 72.1 | 75.9 | 3.8 |
| 1.0 | 68.0 | 75.0 | 7.0 | 67.9 | 76.8 | 8.9 |
| 1.3 | 71.5 | 76.0 | 4.5 | 72.0 | 76.3 | 4.3 |
| 1.7 | 67.0 | 75.5 | 8.5 | 64.8 | 74.5 | 9.7 |
| 2.2 | 67.0 | 75.0 | 8.0 | 71.5 | 75.5 | 4.0 |
| 2.7 | 66.0 | 73.0 | 7.0 | 67.3 | 74.5 | 7.2 |
| 3.2 | 67.0 | 74.0 | 7.0 | 67.0 | 75.0 | 8.0 |
| 4.2 | 68.0 | 73.0 | 5.0 | 68.0 | 74.2 | 6.2 |
| 5.3 | 69.0 | 72.5 | 3.5 | 69.5 | 73.7 | 4.2 |

TABLE 3

NOISE TEST WS1 CONTROL VALVE (inlet pressure 70 PSI) BACKGROUND NOISE WAS 53 (37) Db AT 18" TEST C (A) WEIGHTED

18 INCHES TO THE LEFT SIDE OF VALVE @ 57 HIGH

| | C WEIGHTED | | | A WEIGHTED | | |
|---|---|---|---|---|---|---|
| GPM | WITH AIR | W/O AIR | DIFF. | WITH AIR | W/O AIR | DIFF. |
| 0.7 | 62.2 | 66.0 | 3.8 | 62.3 | 68.5 | 6.2 |
| 1.0 | 58.0 | 67.8 | 9.8 | 58.0 | 70.0 | 12.0 |
| 1.3 | 59.8 | 69.1 | 9.3 | 60.5 | 70.7 | 10.2 |
| 1.7 | 69.0 | 75.8 | 6.8 | 71.5 | 77.0 | 5.5 |
| 2.2 | 60.0 | 74.0 | 14.0 | 61.6 | 75.1 | 13.5 |
| 2.7 | 61.5 | 72.2 | 10.7 | 61.7 | 74.2 | 12.5 |
| 3.2 | 62.8 | 72.5 | 9.7 | 62.1 | 73.8 | 11.7 |
| 4.2 | 64.2 | 72.0 | 7.8 | 65.0 | 74.0 | 9.0 |
| 5.3 | 66.2 | 72.2 | 6.0 | 67.5 | 75.0 | 7.5 |

TABLE 4

NOISE TEST WS1 CONTROL VALVE (inlet pressure 70 PSI) BACKGROUND NOISE WAS 52 (35) dB AT THE 36" POSITION C (A) WEIGHTED

36 INCHES IN FRONT OF VAVLE @ 57" HIGH

| | C WEIGHTED | | | A WEIGHTED | | |
|---|---|---|---|---|---|---|
| GPM | WITH AIR | W/O AIR | DIFF. | WITH AIR | W/O AIR | DIFF. |
| 0.7 | 60.0 | 62.4 | 2.4 | 61.8 | 63.4 | 1.6 |
| 1.0 | 57.0 | 64.0 | 7.0 | 58.1 | 65.5 | 7.4 |
| 1.3 | 63.7 | 68.7 | 5.0 | 64.7 | 71.6 | 6.9 |
| 1.7 | 67.0 | 70.6 | 3.6 | 68.5 | 72.0 | 3.5 |
| 2.2 | 59.3 | 67.6 | 8.3 | 59.4 | 68.4 | 9.0 |
| 2.7 | 59.8 | 66.3 | 6.5 | 59.8 | 67.8 | 8.0 |
| 3.2 | 60.3 | 67.2 | 6.9 | 61.0 | 68.0 | 7.0 |
| 4.2 | 61.8 | 67.0 | 5.2 | 62.0 | 68.3 | 6.3 |
| 5.3 | 63.2 | 66.5 | 3.3 | 64.1 | 67.5 | 3.4 |

As can be seen from the data of Tables 1–4, introducing air via the air inlet passage of the flow control 212 significantly reduces noise levels under all conditions tested.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention.

The invention is not intended to be limited to the preferred embodiments described above, but rather is intended to be limited only by the claims set out below. Thus, the invention encompasses all alternate embodiments that fall literally or equivalently within the scope of these claims.

What is claimed is:

1. A flow control comprising:
   (A) a conduit including an inlet, an outlet, and an outer peripheral surface, a gas inlet passage being formed in said conduit and being configured to permit a gas to enter said conduit between said inlet and said outlet; and
   (B) a flow control washer that is disposed in said conduit between said inlet and said outlet, said flow control washer being configured to maintain a generally constant volumetric liquid flow rate through said flow control despite pressure fluctuations at said inlet of said conduit, wherein said gas inlet passage opens into a low pressure region of said conduit located between said flow control washer and said outlet,
   wherein said low pressure region comprises a venturi, said venturi including a throat, an inlet portion that is located upstream of said throat and that tapers inwardly toward said throat, and an outlet portion that is located downstream of said throat and that tapers outwardly away from said throat, and wherein said gas inlet passage opens into said venturi downstream of said inlet portion,
   wherein said venturi is formed in said conduit, and
   wherein said conduit is formed from two interconnected sections, and wherein said flow control washer is positioned between said sections.

2. A flow control comprising:
   (A) a conduit including an inlet, an outlet, and an outer peripheral surface, a gas inlet passage being formed in said conduit and being configured to permit a gas to enter said conduit between said inlet and said outlet; and (B) a flow control washer that is disposed in said conduit between said inlet and said outlet, said flow control washer being configured to maintain a generally constant volumetric liquid flow rate through said flow control despite pressure fluctuations at said inlet of said conduit, wherein said gas inlet passage opens into a low pressure region of said conduit located between said flow control washer and said outlet, wherein said low pressure region comprises a venturi, said venturi including a throat, an inlet portion that is located upstream of said throat and that tapers inwardly toward said throat, and an outlet portion that is located downstream of said throat and that tapers outwardly away from said throat, and wherein said gas inlet passage opens into said venturi downstream of said inlet portion, and wherein said venturi is formed in an insert that forms at least part of said conduit and that is mounted in a fitting, and wherein said gas inlet passage is formed from a bore in said insert, a passage between said insert and said fitting, and a bore in said fitting that opens to the ambient atmosphere.

3. A flow control comprising:

(A) a conduit including an inlet, an outlet, and an outer peripheral surface, a gas inlet passage being formed in said conduit and terminating in a gas inlet that is configured to permit a gas to flow into said gas inlet passage and enter said conduit between said inlet and said outlet; and (B) a flow control washer that is disposed in said conduit between said inlet and said outlet, said flow control washer being configured to maintain a generally constant volumetric liquid flow rate through said flow control despite pressure fluctuations at said inlet of said conduit, wherein entrance of the gas attenuates noise generation that would otherwise occur through operation of said flow control washer, wherein said gas inlet passage includes a bore having a diameter of between 0.020" and 0.060".

4. A flow control of claim 3, wherein said bore has a diameter of about 0.035".

5. A flow control comprising:

(A) a conduit including an inlet, an outlet, and an outer peripheral surface, a gas inlet passage being formed in said conduit and terminating in a gas inlet that is configured to permit a gas to flow into said gas inlet passage and enter said conduit between said inlet and said outlet;

(B) a flow control washer that is disposed in said conduit between said inlet and said outlet, said flow control washer being configured to maintain a generally constant volumetric liquid flow rate through said flow control despite pressure fluctuations at said inlet of said conduit, wherein entrance of the gas attenuates noise generation that would otherwise occur through operation of said flow control washer; and (C) a one-way valve that is disposed in said gas inlet passage.

6. A flow control comprising:

(A) a conduit including an inlet, an outlet, and an outer peripheral surface, a gas inlet passage being formed in said conduit and being configured to permit a gas to enter said conduit between said inlet and said outlet;

(B) a flow control washer that is disposed in said conduit between said inlet and said outlet, said flow control washer being configured to maintain a generally constant volumetric liquid flow rate through said flow control despite pressure fluctuations at said inlet of said conduit; and (C) a one-way valve that is disposed in said gas inlet passage, wherein the one-way valve comprises a duck-billed valve.

7. A flow control comprising:

(A) a conduit including an inlet, an outlet, and an outer peripheral surface, wherein a venturi is disposed in said conduit between said inlet and said outlet, said venturi including a throat, an inlet portion that is located upstream of said throat and that tapers inwardly toward said throat, and an outlet portion that is located downstream of said throat and tapers outwardly away from said throat, and wherein an ambient air inlet passage is formed in said conduit and terminates in an ambient air inlet that is configured to permit ambient air to flow into said ambient air inlet passage and enter said venturi downstream of said inlet portion; and (B) a flow control washer that is disposed in said conduit between said inlet and said venturi, said flow control washer being configured to maintain a generally constant volumetric liquid fluid flow rate therethrough despite pressure fluctuations at said inlet of said conduit, wherein entrance of the ambient air attenuates noise generation that would otherwise occur through operation of said flow control washer.

8. A control valve comprising:

(A) a service port configured for connection to a resin tank containing a treatment medium;

(B) an inlet port configured for connection to a source of untreated water;

(C) a treated water outlet port;

(D) a wastewater drain port; and (E) a flow control coupled to said wastewater drain port, said flow control including
  (1) conduit including an inlet, an outlet, and an outer peripheral surface, wherein a venturi is disposed in said conduit between said inlet and said outlet, said venturi including a throat, an inlet portion that is located upstream of said throat and that tapers inwardly toward said throat, and an outlet portion that is located downstream of said throat and that tapers outwardly away from said throat, and wherein an ambient air inlet passage is formed in said conduit and is configured to permit ambient air to enter said venturi downstream of said inlet portion from a location external of said water softener control valve;
  (2) a one way valve disposed in said ambient air inlet passage; and
  (3) a flow control washer that is disposed in said body between said inlet and said venturi, said flow control washer being configured to maintain a generally constant fluid volumetric liquid flow rate therethrough despite pressure fluctuations at said inlet.

9. A water softener comprising:

(A) a brine tank;

(B) a resin tank contain a treatment medium; and (C) a water softener control valve including
  (1) a brine port fluidically coupled to said brine tank;

(2) a service port fluidically coupled to said resin tank; and
(3) an inlet port configured for connection to a source of untreated water;
(4) a treated water outlet port;
(5) a wastewater drain port; and
(6) a flow control coupled to said wastewater drain port, said flow control including
  (a) a conduit including an inlet, an outlet, and an outer peripheral surface, wherein a venturi is disposed in said conduit between said inlet and said outlet, said venturi including a throat, an inlet portion that is located upstream of said throat and that tapers inwardly toward said throat, and an outlet portion that is located downstream of said throat and that tapers outwardly away from said throat, and wherein an ambient air inlet passage is formed in said conduit and is configured to permit ambient air to enter said venturi downstream of said inlet portion from a location external of said water softener control valve;
  (b) a one way valve disposed in said ambient air inlet passage; and
  (c) a flow control washer that is disposed in said body between said inlet and said venturi, said flow control washer being configured to maintain a generally constant volumetric liquid flow rate therethrough despite pressure fluctuations at said inlet.

10. A method of controlling flow of a liquid through a conduit comprising:
  (A) directing the liquid to flow through said conduit at an initial supply pressure that fluctuates;
  (B) directing the liquid through an aperture in a flow control washer located within said conduit, said aperture varying in size with fluctuations in supply pressure so as to maintain an at least generally constant volumetric liquid flow rate through said aperture; and
  (C) attenuating noise generation that would otherwise occur through operation of said flow control washer by admitting a gas into said conduit.

11. A method of claim 10, wherein the noise attenuation step comprises admitting ambient air into a low pressure region of said conduit located downstream of said flow control washer.

12. A method of claim 11, wherein said low pressure region comprises a venturi having a throat, an inlet portion that is located upstream of said throat and that tapers inwardly toward said throat, and an outlet portion that is located downstream of said throat and that tapers outwardly away from said throat, and wherein the noise attenuation step comprises admitting ambient air into said venturi at a location downstream of said inlet portion.

13. A method of claim 10, wherein the noise attenuation step comprises admitting ambient air into an ambient air inlet passage opening into said conduit, and further comprising preventing liquid flow out of said ambient air inlet passage via operation of a one-way valve disposed in said ambient air inlet passage.

14. A method of claim 10, wherein the noise attenuation step comprises reducing noise levels by at least 5 decibels when compared to noises that would be generated by flow of the same liquid through said orifice at the same average supply pressure and the same volumetric flow rate.

15. A method of claim 10, wherein the step (A) comprises directing liquid through said conduit at a volumetric flow rate of between 0.5 gpm and 25 gpm.

16. A method of claim 10, wherein the step (A) comprises directing liquid into said conduit at an average supply pressure of between 20 psi and 125 psi.

17. A flow control comprising:
  (A) a conduit including an inlet and an outlet;
  (B) a flow control washer that is disposed in said conduit between said inlet and said outlet, said flow control washer being configured to maintain a generally constant volumetric liquid flow rate through said flow control despite pressure fluctuations at said inlet of said conduit; and
  (C) means, communicating with said conduit, for attenuating noise generation that would otherwise occur through operation of said flow control washer by admitting a gas into said conduit,
  wherein the means for attenuating noise generation comprises a gas inlet passage opening into said conduit and configured to permit a gas to enter said conduit between said inlet and said outlet,
  wherein said gas inlet passage opens into a low pressure region of said conduit located between said flow control washer and said outlet, and
  wherein said low pressure region comprises a venturi, said venturi including a throat, an inlet portion that is located upstream of said throat and that tapers inwardly toward said throat, and an outlet portion that is located downstream of said throat and that tapers outwardly away from said throat, and wherein said gas inlet passage opens into said venturi downstream of said inlet portion.

18. A flow control of claim 17, wherein said gas inlet passage opens into said throat.

19. A flow control of claim 17, wherein said gas inlet passage opens into said downstream portion of said venturi.

* * * * *